Nov. 18, 1958     M. C. BURNS     2,860,832
COUNTER AND RECORDER COMBINATION
Filed March 22, 1955     3 Sheets-Sheet 1

FIG.1

INVENTOR.
MERYL C. BURNS
BY
William J. Flynn
ATTORNEY

Nov. 18, 1958 M. C. BURNS 2,860,832
COUNTER AND RECORDER COMBINATION
Filed March 22, 1955 3 Sheets-Sheet 2

INVENTOR.
MERYL C. BURNS
BY
William J. Flynn
ATTORNEY

Nov. 18, 1958  M. C. BURNS  2,860,832
COUNTER AND RECORDER COMBINATION
Filed March 22, 1955  3 Sheets-Sheet 3

FIG. 4

INVENTOR.
MERYL C. BURNS
BY
William J. Flynn
ATTORNEY

United States Patent Office 2,860,832
Patented Nov. 18, 1958

2,860,832
COUNTER AND RECORDER COMBINATION

Meryl C. Burns, Cleveland Heights, Ohio, assignor to Clevite Corporation, Cleveland, Ohio, a corporation of Ohio Application March 22, 1955, Serial No. 495,861

8 Claims. (Cl. 235—92)

This invention relates generally to a counter and recorder combination.

The majority of present-day commercial electronic counters comprise a plurality of decade units, each consisting of four binary counting stages interconnected and permutated to count input pulses up to ten and then to re-cycle after each tenth pulse. Each tenth pulse to one decade unit causes an input pulse to be supplied to the succeeding decade unit in the series, and a suitable number of such decade units are connected in series to count the input pulses in units, tens, hundreds, thousands, etc. Counters of this general type have proved capable of counting at a rate as fast as 10,000,000 pulses per second or higher.

Two general types of visual readout devices have been provided for such counters: (1) a series of ten neon lamps for each decade unit which light up individually, depending upon the instantaneous pulse count in that decade unit; and (2) a current operated indicator, such as a meter, for each decade unit. Neither of these prior types of readout gives a permanent visual record of the total pulse count. For certain applications of such counters it is extremely desirable to have such a permanent visual record.

It is an object of the present invention to provide a novel combination of a counter and a visual recorder operated from the counter to give a permanent visual record of the pulses counted by the counter.

It is also an object of this invention to provide a novel counter and recorder combination for making a visual record of the pulse repetition rate of pulses applied to the counter.

A particular aspect of this invention is directed to such a novel combination of a counter and a visual recorder in which the counter consists of a plurality of decade units connected in series and in which there is provided a stepping switch for connecting the decade units individually in succession to the visual recorder, which records the instantaneous pulse count at each particular decade unit. Thus, the visual trace recorded by the visual recorder consists of a series of successive incremental traces which represent the respective counts from the decade units and thereby designates the total pulse count.

Accordingly, it is also an object of this invention to provide a novel counter and visual recorder combination in which the counter consists of a series of decade units and the recorder is connected successively to each decade unit to record the pulse count thereat and produce a visual record which tells the total pulse count.

Other and further objects and advantages of the present invention will be apparent from the following description of a preferred embodiment thereof illustrated in the accompanying drawings.

Overall system and operation

Figure 1:
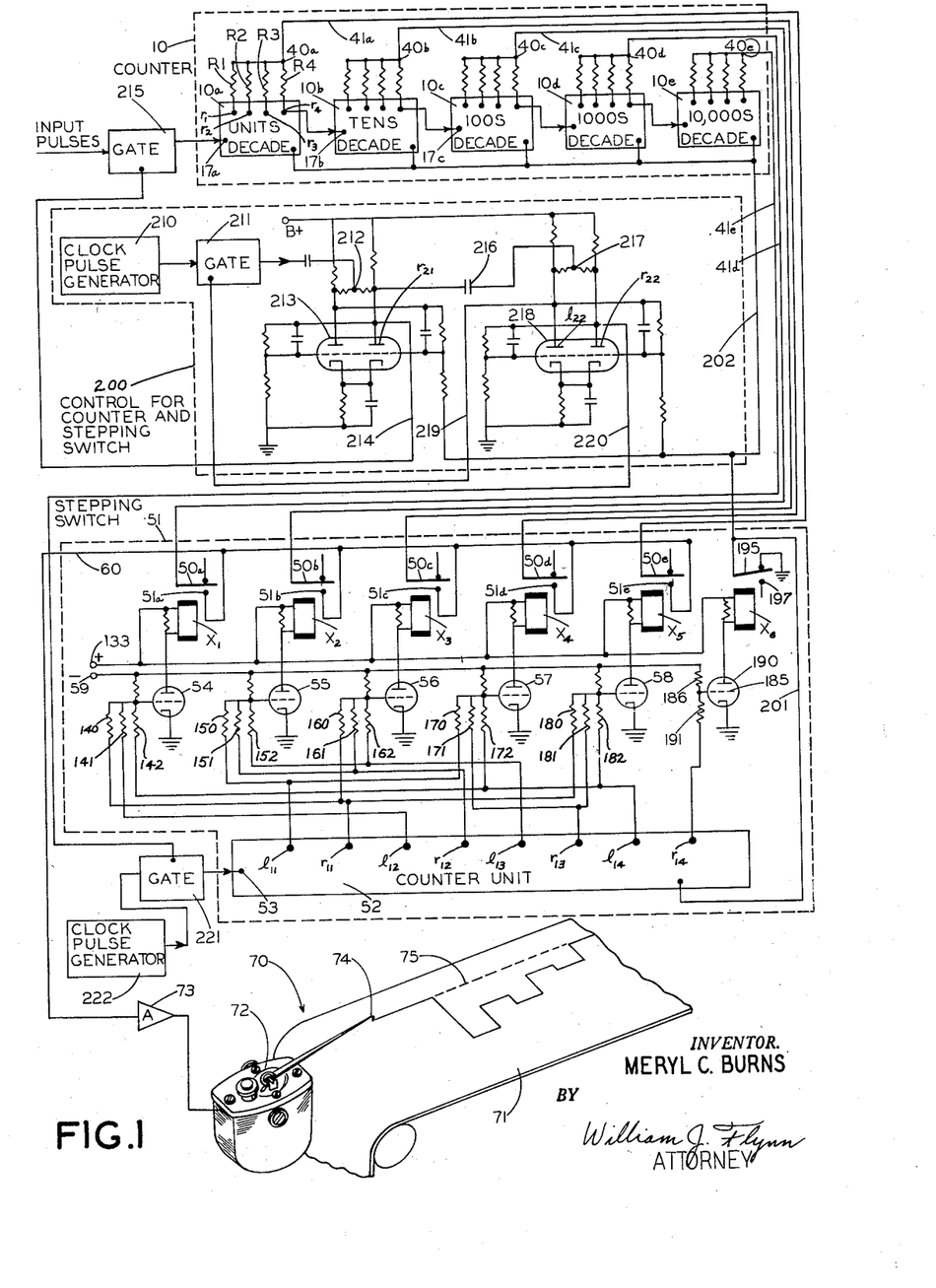
Figure 1 is a schematic drawing of the present counter and recorder combination.

Referring to Fig. 1, in broad outline the present invention comprises a counter 10 consisting of a plurality of decade units connected in series, each of these decade units having a stepped voltage readout, a stepping switch 51 operative to sample the voltage at each of these readouts, a control 200 for the counter and stepping switch, and a visual recorder 70 connected to the stepping switch to record a visual trace made up of a series of trace increments whose positions on the record member correspond to the instantaneous voltages at the readouts of the counter decade units as each is sampled.

Briefly, the counter 10 comprises a units decade 10a consisting of four binary stages interconnected and permutated to re-cycle aften ten input pulses to its input terminal 17a, and a similar tens decade 10b, hundreds decade 10c, thousands decade 10d and ten thousands decade 10e. The decades are connected in series in the usual manner so that every ten input pulses to the units decade causes a single input pulse to be delivered to the input terminal 17b for the tens decade, every ten input pulses to the tens decade causes a single input pulse to be delivered to the input terminal 17c for the hundreds decade, etc.

Each of the decades in the counter 10 has a stepped voltage readout, with the readout voltage increasing in successive abrupt steps in response to successive input pulses. Preferably, each of the decade units is of the type described and claimed in my copending application Serial No. 476,429, filed December 20, 1954, assigned to the assignee of the present invention, and described in detail hereinafter. The stepped voltage readout is obtained by a resistance matrix consisting of resistors $R_1$, $R_2$, $R_3$ and $R_4$, each having one of its terminals connected to an appropriate anode in the corresponding counter decade and each having its other terminal connected to a common readout terminal.

The readout terminal 40e for the ten thousands decade 10e in the counter is connected through line 41e to the movable contact 50a of relay $X_1$ in the stepping switch 51. The readout terminal 40d for the thousands decade 10d in the counter is connected through line 41d to the movable contact 50b of relay $X_2$ in the stepping switch. The readout terminal 40c for the hundreds decade 10c in the counter is connected through line 41c to the movable contact 50c of relay $X_3$ in the stepping switch. The readout terminal 40b for the tens decade 10b in the counter is connected through line 41b to the movable contact 50d of relay $X_4$ in the stepping switch. The readout terminal 40a for the units decade 10a in the counter is connected through line 41a to the movable terminal 50e of relay $X_5$ in the stepping switch.

Relays $X_1$–$X_5$ form part of a stepping switch 51 of the type disclosed and claimed in my copending application Serial No. 493,594, filed March 11, 1955, assigned to the assignee of the present invention, and described in detail hereinafter. This stepping switch comprises an electronic counter unit 52 having an input terminal 53 to which are applied pulses having a predetermined repetition rate, such as 50 cycles per second. As described in detail hereinafter, the counter unit 52 includes four pairs of electron tubes interconnected to operate in binary progression and having respective anodes $l_{11}$, $r_{11}$, $l_{12}$, $r_{12}$, $l_{13}$, $r_{13}$ and $l_{14}$ connected in a particular arrangement through resistance matrices to the control grids of amplifying tubes 54, 55, 56, 57 and 58, which individually control the energization of relays $X_1$–$X_5$. These amplifying tubes are biased non-conducting through resistances connected to a negative supply terminal 59, thereby maintaining relays $X_1$–$X_5$ normally de-energized. In response to successive input pulses to the counter unit 52, the amplifying tubes are rendered conductive individually in succession, thereby completing energization circuits for the corresponding relays which, in turn, operate the associated movable contacts to successively connect each decade in the counter 10 to the visual recorder 70. Thus, for example, in response to the first input pulse to the counter unit 52 relay $X_1$ is energized and actuates its movable contact 50a to engage its lower fixed contact 51a, thereby connecting the readout terminal 40a of the units decade 10a in the counter 10 through line 41a and the $X_1$ relay contacts 50a and 51a to the line 60 leading to visual recorder 70.

In like manner the other relays $X_2$–$X_5$ are provided with lower fixed contacts 51b–51e connected to line 60 and positioned to be engaged by the movable contact of the corresponding relay in response to the energization of that relay.

The overall operation of the stepping switch arrangement designated generally at 51 in Fig. 1 is simply to connect the readout terminals 40a–40e for the successive decades in counter 10 individually in succession to the visual recorder 70 in rapid sequence.

The visual recorder assembly 70 comprises a movable paper record chart 71 and a magnetic pen recorder 72 in recording relation to the record chart. In one desirable embodiment the pen recorder is of the type disclosed and claimed in U. S. Letters Patent 2,478,329 to H. Shaper and described in greater detail hereinafter. An amplifier 73 is connected between line 59 and the operating coil of the magnetic pen motor in the pen recorder 72. The pen recorder has a recording stylus 74, which overlies the movable record chart 71.

At "zero" pulse count each of the counter decades 10a–10e produces a low voltage at its readout terminal 40a–40e. This low voltage is suitably balanced out so that when amplifier 73 for the pen recorder 72 is connected (through stepping switch 51) to a counter decade which has a "zero" pulse count the pen stylus 74 makes a trace along the "zero" line 75 on the record chart 71.

At pulse count "one" to the particular counter decade to which the stepping switch 51 connects the pen motor at any instant, the voltage at the readout terminal of that counter decade is one increment above its value at zero pulse count. This voltage increment is amplified by amplifier 73 and applied to the coil of the pen motor, causing the pen stylus 74 to be displaced one space increment away from the "zero line" on the record chart.

At pulse count "two" to the particular counter decade to which the stepping switch connects the pen motor at any instant, the voltage at the readout terminal for that counter decade is two increments above its value at "zero" pulse count. This voltage increment is amplified by amplifier 73 and applied to the coil of the pen motor, causing the pen stylus 74 to swing to a position two space increments away from the "zero line" on the record chart.

Similarly, at higher pulse counts the pen stylus swings to corresponding positions displaced from the "zero line" on the record chart.

Thus, the pen stylus records a series of straight lines each of which has a position displaced from the zero line 75 on the record chart which is determined by the pulse count in the counter decade to which the pen recorder is connected at that instant. The stepping switch 51 and the counter 10, both under the control of the control circuit 200 as described in detail hereinafter, function such that the voltages at the readout terminals of the ten thousands counter decade 10e, the thousands decade 10d, the hundreds decade 10c, the tens decade 10b and the units decade 10a are applied in quick succession to the pen recorder, which records a trace which tells the total pulse count in counter 10 at the time of sampling.

Turning now to the details of the individual portions of the present invention:

*Counter having stepped voltage readout from each decade*

Figure 2:
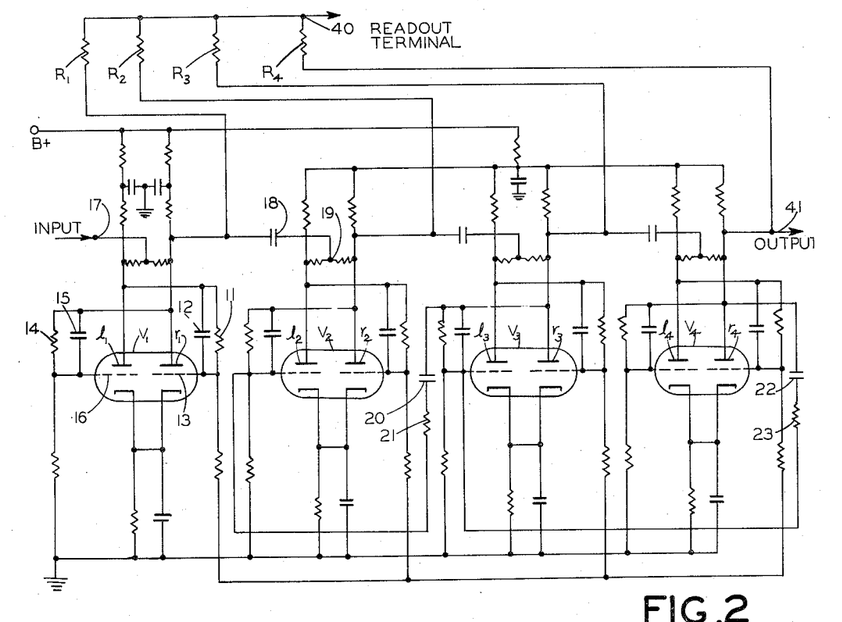
Figure 2 is a circuit diagram of one of the counter decades in the counter forming part of the Fig. 1 combination.

Each counter decade and resistance matrix in the counter 10 providing stepped voltage readout preferably is identical to that shown in Fig. 2. This counter decade having a stepped voltage readout is the subject of my copending application Serial No. 476,429, filed December 20, 1954.

Referring to Fig. 2, the counter decade itself is of known design, comprising four binary trigger stages, each of which is capable of assuming either of two stable conditions. In this instance each binary stage comprises two triodes, preferably in a common envelope to provide a double triode, in which the control grid of the first triode is coupled to the anode of the other triode through a network consisting of parallel-connected resistor and capacitor, while the control grid of the other triode is coupled to the anode of the first triode through a network of a parallel-connected resistor and capacitor. Thus, in Fig. 2 the anode $l_1$ of the left side of the double triode $V_1$ is coupled through a network consisting of parallel-connected resistor 11 and capacitor 12 to the control grid 13 of the right side of tube $V_1$. The anode $r_1$ of the right side of the double triode $V_1$ is coupled through a network consisting of parallel-connected resistor 14 and capacitor 15 to the control grid 16 of the left side of tube $V_1$. Similarly the opposite anodes and control grids of the succeeding double triodes in the counter decade are coupled together in the same manner. The anodes of the left sides of these tubes are denoted $l_2$, $l_3$ and $l_4$, respectively, and the anodes of the right sides of these tubes are designated $r_2$, $r_3$ and $r_4$, respectively.

In the operation of the first binary stage, assume that initially the right side of tube $V_1$ in conducting. When a negative pulse is applied to the input terminal 17 common to both anodes of this tube it will cause the previously conducting right side of $V_1$ to cut off and will cause the left side to conduct. The second pulse will cut off the left side of $V_1$ and render the right side conductive. Thus, successive input pulses cause the left and right sides of tube $V_1$ to conduct in alternate sequence.

The anode $r_1$ of the right side of the first tube in the series is coupled through a capacitor 18 to the input terminal 19 for the second binary stage, which is common to both of the anodes $l_2$ and $r_2$ of the second tube $V_2$. Anode $r_1$ in the first binary stage triggers the second binary stage once for each two input pulses supplied to the first binary stage. Thus, assuming that the right side of tube $V_2$ is conducting initially, it will remain conducting during the first input pulse to the first binary stage ($V_1$). The second input pulse to $V_1$, which renders $r_1$ conductive, will cause the current in $V_2$ to shift to its left anode $l_2$, and this condition will prevail also through the third input pulse to $V_1$, during which $l_1$ conducts. The fourth input pulse to $V_1$, which causes $r_1$ to conduct again, results in a shift of the current in $V_2$ back to its right anode $r_2$, and so on. Thus, the second binary stage reverses in response to every second input pulse to the first binary stage.

In like manner, the right anode $r_2$ of the second binary stage ($V_2$) is coupled to the anodes of the third binary stage ($V_3$) so as to shift the conduction in the third binary stage each time the anode $r_2$ starts to conduct after previously being non-conducting, and the right anode $r_3$ of the third binary stage is coupled to the anodes of the fourth binary stage ($V_4$) so as to shift the conduction in the fourth binary stage each time the anode $r_3$ starts to conduct after previously being non-conducting.

In order that the counter decade consisting of the four binary stages will re-cycle after ten pulses, there are provided feedback networks between certain binary stages which introduce false pulse counts, so that the circuit does not proceed through a cycle of sixteen pulses before recycling, as it would do in the absence of these feedback networks. A first feedback network comprising a series-connected capacitor 20 and resistor 21 couples the right anode $r_3$ of tube $V_3$ of the third binary stage back to the tube $V_2$ of the second binary stage. This introduces a false count of "two" into the circuit in response to the fourth input pulse. A second feedback network comprising a series-connected capacitor 22 and resistor 23 couples the right anode $r_4$ of the fourth binary stage back to the tube $V_3$ of the third binary stage, so as to inject a false count of "four" into the circuit in response to the sixth input pulse.

The output from this counter decade is through a line 41 connected directly to the right anode $r_4$ of the fourth binary tube $V_4$.

Thus far, the counter decade is conventional.

In accordance with the invention claimed in my above-mentioned U. S. patent application Serial No. 476,429, there is provided a combination of resistors which enable the production of output voltages from the counter decade which change progressively in a series of equal steps as successive pulses are counted. Referring to Fig. 2 there is provided a first resistor $R_1$ which has one of its terminals connected to the right anode $r_1$ of the first binary tube $V_1$, with its opposite terminal connected to a common readout terminal 40. A second resistor $R_2$, having an ohmic value of one-half of $R_1$, is connected between the right anode $r_2$ of the second binary tube $V_2$ and the common readout terminal 40. A third resistor $R_3$, having an ohmic value of one-half that of $R_1$, is connected between the right anode $r_3$ of the third binary tube $V_3$ and the common readout terminal 40. A fourth resistor $R_4$, which has an ohmic value of one-fourth that of $R_1$, is connected between the right anode $r_4$ of the third binary tube $V_4$ and the common readout terminal 40.

In the operation of the counter decade the various conditions are as shown in the following table, with X denoting conduction maintained throughout the period following a pulse and before the next pulse is received, $t$ denoting temporary conduction which is initiated by a signal pulse but which is then eliminated due to feedback, and $f$ denoting conduction caused by feedback.

| Pulse | $V_1$ | | $V_2$ | | $V_3$ | | $V_4$ | |
|---|---|---|---|---|---|---|---|---|
| | $l_1$ | $r_1$ | $l_2$ | $r_2$ | $l_3$ | $r_3$ | $l_4$ | $r_4$ |
| 0, 10 | | X | | X | | X | | X |
| 1 | X | | | X | | X | | X |
| 2 | | X | X | | | X | | X |
| 3 | X | | X | | | X | | X |
| 4 | | X | $f$ | $t$ | X | | | X |
| 5 | X | | X | | X | | | X |
| 6 | | X | | X | $f$ | $t$ | X | |
| 7 | X | | | X | | X | X | |
| 8 | | X | X | | | X | X | |
| 9 | X | | X | | | X | X | |

Initially (at "pulse zero") or at pulse 10, each of the right anodes $r_1$, $r_2$, $r_3$ and $r_4$ conducts, so that current flows through each of the readout resistors $R_1$, $R_2$, $R_3$ and $R_4$, which are connected respectively to these right anodes. This establishes some predetermined low voltage level at the common readout terminal 40, which may be balanced out so that the readout signal reads zero at this time.

At pulse 1 the right anode $r_1$ of the first binary tube $V_1$ ceases to conduct, so that the voltage at this anode rises to a higher value, while the voltages at the right anodes $r_2$, $r_3$ and $r_4$ of the second, third and fourth binary tubes (which continue to conduct) remain at the previous low level. As a result, the voltage at the readout terminal 40 rises to a value higher than its initial level. This voltage rise is inversely proportional to the ohmic resistance of the resistor $R_1$ connected to the right anode $r_1$ of the first binary tube $V_1$, which is non-conducting at this time.

Next, when pulse 2 is received the right anode $r_2$ of the second binary tube $V_2$ ceases to conduct, while the right anodes $r_1$, $r_3$ and $r_4$ of the first, third and fourth binary tubes conduct. The voltage at the non-conducting anode $r_2$ rises to a level higher than its original value, while the voltages at the conducting anodes $r_1$, $r_3$ and $r_4$ are low. Consequently, the voltage at the readout terminal 40 rises another step, equal to the first, to a value inversely proportional to the ohmic resistance of the resistor $R_2$ connected to the anode $r_2$ of the second binary tube $V_2$, which is non-conducting at this time.

In like manner, on successive input pulses the voltage at the readout terminal 40 rises in equal steps, until the tenth pulse, which restores the voltage at the readout terminal to its original lowest level.

In one practical embodiment, the resistors $R_1$, $R_2$, $R_3$ and $R_4$ in the readout matrix are 4 megohms, 2 megohms, 2 megohms and 1 megohm, respectively, and the readout terminal voltage rises in steps of about four volts upon successive input pulses. The relative proportions of the ohmic values of the resistors $R_1$, $R_2$, $R_3$ and $R_4$ in the present readout arrangement are quite important since they determine the magnitudes of the readout voltage steps produced in response to successive input pulses into the decade counter unit. With the particular permutated binary counter decade shown these resistors $R_1$, $R_2$, $R_3$, $R_4$, have resistance values in the proportions 4:2:2:1, so that these voltage steps are equal in magnitude.

In this particular counter decade having the four binary stages interconnected and permutated as disclosed above, it will be apparent that the first binary stage has an adding weight "1," the second binary stage has an adding weight "2," the third binary stage has an adding weight "2," and the fourth binary stage has an adding weight "4." By "adding weight" is meant the numerical value in the total pulse count due to a reversal of current conduction in that particular binary stage. With the above-described readout resistance matrix the resistors $R_1$–$R_4$ connected respectively to the binary stages have relative ohmic proportions 4:2:2:1. Thus, the relative ohmic values of the readout resistors are in inverse relation to the adding weights of the corresponding binary stages in order to achieve the equally stepped voltage readout at terminal 40.

Stepping switch

Figure 4:
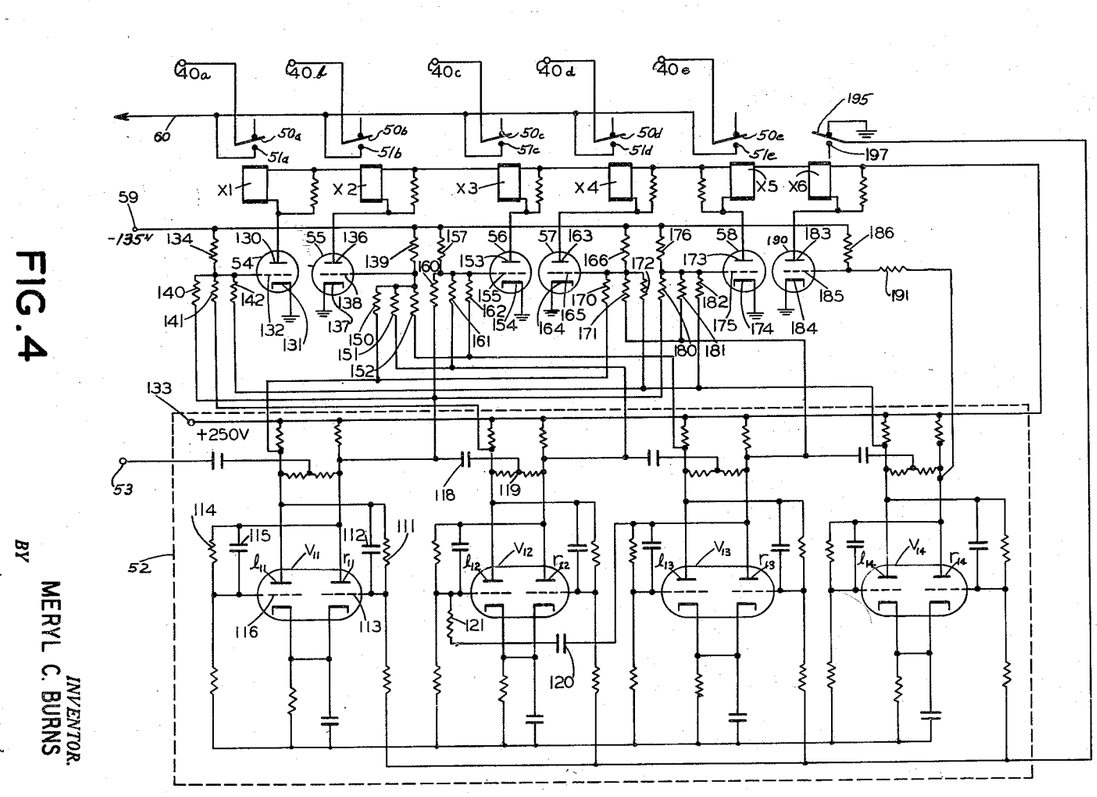
Figure 4 is a circuit diagram of the stepping switch which is part of the Fig. 1 combination.

Referring to Fig. 4 the switching arrangement in the present counter and recorder combination is of the type disclosed and claimed in my copending U. S. patent application Serial No. 493,594, filed March 11, 1955, and includes a counter unit 52 of the same general type as in Fig. 2, having four binary trigger stages, each of which is capable of assuming either of two stable conditions. Each binary stage comprises two triodes having the control grid of one triode coupled to the anode of the other triode through a network consisting of parallel-connected resistor and capacitor, while the control grid of the other triode is coupled to the anode of the first triode through a network of a parallel-connected resistor and capacitor. Thus, in Fig. 4 the anode $l_1$ of the left side of the double triode $V_{11}$ is coupled through a network consisting of parallel-connected resistor 111 and capacitor 112 to the control grid 113 of the right side of tube $V_{11}$. The anode $r_{11}$ of the right side of the double triode $V_{11}$ is coupled through a network consisting of parallel-connected resistor 114 and capacitor 115 to the control grid 116 of the left side of tube $V_{11}$. Similarly the opposite anodes and control grids of the succeeding double triodes $V_{12}$, $V_{13}$ and $V_{14}$ in the decade counter unit are coupled together in the same manner. The anodes of the left sides of these tubes are denoted $l_{12}$, $l_{13}$ and $l_{14}$, respectively, and the anodes of the right sides of these tubes are designated $r_{12}$, $r_{13}$ and $r_{14}$, respectively.

In the operation of the first binary stage, assume that initially the right side of tube $V_{11}$ is conducting. When a negative pulse is applied to the input terminal 53 common to both anodes of this tube it will cause the previously conducting right side of $V_{11}$ to cut off and will cause the left side to conduct. The second pulse will cut off the left side of $V_{11}$ and render the right side conductive. Thus, successive input pulses cause the left and right sides of tube $V_{11}$ to conduct in alternate sequence.

The anode $r_{11}$ of the right side of the first tube in the series is coupled through a capacitor 118 to the input terminal 119 for the second binary stage, which is common to both of the anodes $l_{12}$ and $r_{12}$ of the second tube $V_{12}$. Anode $r_{11}$ in the first binary stage triggers the second binary stage once for each two input pulses supplied to the first binary stage. Thus, assuming that the right side of tube $V_{12}$ is conducting initially, it will remain conducting during the first input pulse to the first binary stage $(V_{11})$. The second input pulse to $V_{11}$, which renders $r_{11}$ conductive, will cause the current in $V_{12}$ to shift to its left anode $l_{12}$, and this condition will prevail also through the third input pulse to $V_{11}$, during which $l_{11}$ conducts. The fourth input pulse to $V_{11}$, which causes $r_{11}$ to conduct again, results in a shift of the current in $V_{12}$ back to its right anode $r_{12}$, and so on. Thus, the second binary stage reverses in response to every second input pulse to the first binary stage.

In like manner, the right anode $r_{12}$ of the second binary stage $(V_{12})$ is coupled to the anodes of the third binary stage $(V_{13})$ so as to shift the conduction in the third binary stage each time the anode $r_{12}$ starts to conduct after previously being non-conducting, and the right anode $r_{13}$ of the third binary stage is coupled to the anodes of the fourth binary stage $(V_{14})$ so as to shift the conduction in the fourth binary stage each time the anode $r_{13}$ starts to conduct after previously being non-conducting.

For reasons which will be apparent hereinafter, there is provided a feedback network between certain binary stages which introduces an artificial, or false, pulse count which alters the cycle of the counter unit. This feedback network comprising a series-connected capacitor 120 and resistor 121 couples the right anode $r_{13}$ of tube $V_{13}$ of the third binary stage back to the tube $V_{12}$ of the second binary stage. This introduces a false count of "two" into the circuit in response to the fourth input pulse.

Thus far, the described arrangement is the same as that found in the decade unit of a conventional electronic counter.

The particular stepping switch arrangement of Fig. 4 includes a plurality of relays arranged to be energized separately upon successive input pulses to the above-described counter unit 52. These relays are under the control of amplifying devices which are normally biased to cut off and which are rendered conductive individually in succession upon successive input pulses to the counter unit 52.

Referring to Fig. 4, there are provided six relays, $X_1$, $X_2$, $X_3$, $X_4$, $X_5$ and $X_6$. Relay $X_1$ has one terminal of its coil connected to the anode 130 of an amplifying device in the form of a triode 54 having a cathode 131 and a control grid 132. The other terminal of relay $X_1$ is connected directly to the +250 volt power supply terminal 133. The control grid 132 of triode 54 is biased negative through a resistor 134 connected to the −135 volt terminal 59.

A resistance matrix consisting of three resistors 140, 141 and 142 controls the potential at grid 132 as follows:

Each of these resistors has one terminal connected directly to control grid 132. The other terminal of resistor 140 is connected directly to the right anode $r_{11}$ of the first binary stage $(V_{11})$ in the counter unit 52. The other terminal of resistor 141 is connected directly to the left anode $l_{12}$ of the second binary stage $(V_{12})$. The third resistor 142 in this matrix is connected directly to the left anode $l_{14}$ of the fourth binary stage $(V_{14})$ in the counter unit 52. If any one of these anodes in the binary stages, to which the resistors 140–142 are connected, is conducting, the potential at grid 132 will be sufficiently low to maintain this triode 54 cut off and the relay $X_1$ de-energized. However, if each of these anodes in the binary stages is non-conducting, this raises the potential at grid 132 to a positive value which causes triode 54 to conduct and thereby energize relay $X_1$. This condition obtains at one particular pulse count into the counter unit 52, as explained in greater detail hereinafter.

Relay $X_2$ has one terminal of its coil connected to the power supply terminal 133 and the other terminal of its coil connected to the anode 136 of an amplifying device in the form of a triode 55 having a cathode 137 and a control grid 138. The control grid 138 of this triode is biased negative through a resistor 139 connected to the negative terminal 59.

A resistance matrix consisting of resistors 150, 151 and 152 controls the potential at grid 138 as follows:

Each of these resistors has one of its terminals connected directly to control grid 138. The other terminal of resistor 150 is connected directly to the left anode $l_{11}$ of the first binary stage $(V_{11})$ in the counter unit 52. The other terminal of resistor 151 is connected directly to the right anode $r_{12}$ of the second binary stage $(V_{12})$ in the counter unit 52. The other terminal of resistor 152 is connected directly to the left anode $l_{13}$ of the third binary stage $(V_{13})$ in the counter unit 52. If any one of these anodes in the binary stages, to which the resistors 150–152 are connected, is conducting, the potential at grid 138 will be sufficiently low to maintain triode 55 cut off and the relay $X_2$ de-energized. However, if each of these anodes in the binary stages is non-conducting, this raises the potential at grid 138 to a positive value which causes triode 55 to conduct and thereby energize relay $X_2$. This condition is obtained at a particular pulse count into the counter unit 52 different from that at which relay $X_1$ is energized.

Relay $X_3$ has its coil connected between the positive power supply terminal 133 and the anode 53 of a triode 56 having a cathode 154 and a control grid 155. The control grid 155 is biased negative through a resistor 157 connected to the negative terminal 59.

A resistance matrix consisting of three resistors 160, 161 and 162 controls the potential at grid 155 as follows:

Each of these resistors has one terminal connected directly to control grid 155. The other terminal of resistor 160 is connected directly to the right anode $r_{11}$ of the first binary stage $(V_{11})$ in the counter unit 52. The other terminal of resistor 161 in this matrix is connected directly to the right anode $r_{12}$ of the second binary stage $(V_{12})$ in the counter unit 52. The third resistor 162 in this matrix has its other terminal connected directly to the left anode $l_{13}$ of the third binary stage $(V_{13})$ in the counter unit 52. If any one of these anodes in the binary stages, to which the resistors 160–162 are connected, is conducting, the potential at grid 155 will be sufficiently low to maintain this triode cut off and the relay $X_3$ de-energized. However, if each of these anodes in the binary stages is non-conducting, this raises the potential at grid 155 to a positive value which causes triode 56 to conduct and thereby energizes relay $X_3$. This condition obtains at a particular pulse count into the counter unit 52 different from the respective pulse counts at which relays $X_1$ and $X_2$ are energized.

Relay $X_4$ has its coil connected between the positive power supply terminal 133 and the anode 163 of a triode 57 having a cathode 164 and a control grid 165. Control grid 165 is biased negative through a resistor 166 connected to the negative terminal 59.

A resistance matrix consisting of resistors 170, 171 and 172 controls the potential at grid 165 as follows:

Each of these resistors has one terminal connected directly to control grid 165. The other terminal of resistor 170 is connected directly to the left anode $l_{11}$ of the first binary stage ($V_{11}$) in the counter unit 52. The other terminal of resistor 171 in this matrix is connected directly to the right anode $r_{13}$ of the third binary stage ($V_{13}$) in this counter unit. The other terminal of the third resistor 172 in this matrix is connected directly to the left anode $l_{14}$ of the fourth binary stage ($V_{14}$) in this counter unit. If any one of these anodes in the binary stages, to which the resistors 170–172 are connected is conducting, the potential at grid 165 will be sufficiently low to maintain this triode cut off and the relay $X_4$ de-energized. However, if each of these anodes in the binary stages is non-conducting, this raises the potential at grid 165 to a positive value which causes triode 57 to conduct and thereby energize relay $X_4$. This condition obtains at a particular pulse count into the counter unit 52 different from those at which the relays $X_1$, $X_2$ and $X_3$ are energized, respectively.

Relay $X_5$ has its coil connected between the positive power supply terminal 133 and the anode 173 of a triode 58 having a cathode 174 and a control grid 175. The control grid 175 is biased negative through a resistor 176 connected to the negative terminal 59.

A resistance matrix consisting of three resistors, 180, 181 and 182, controls to potential at grid 175 as follows:

Each of these resistors has one terminal connected directly to control grid 175. The other terminal of resistor 180 is connected directly to the right anode $r_{11}$ of the first binary stage ($V_{11}$) in the counter unit 52. The other terminal of resistor 181 in this matrix is connected directly to the right anode $r_{13}$ of the third binary stage ($V_{13}$) in this counter unit. The third resistor 182 in this matrix has its other terminal connected directly to the left anode $l_{14}$ of the fourth binary stage ($V_{14}$) in this counter unit. If any one of these anodes in the binary stages, to which the resistors 180–182 are connected, is conducting, the potential at grid 175 will be sufficiently low to maintain triode 58 cut off and the relay $X_5$ de-energized. However, if each of these anodes in the binary stages is non-conducting, this raises the potential at grid 175 to a positive value which causes this triode to conduct and thereby energize relay $X_5$. This condition obtains at a particular pulse counter unit 52 different from those at which the relays $X_1$, $X_2$, $X_3$ and $X_4$ are energized, respectively.

The coil of relay $X_6$ is connected between the positive power supply terminal 133 and the anode 183 of a triode 190, which has a cathode 184 and a control grid 185. Control grid 185 is biased negative through a resistor 186 connected to the negative terminal 59.

A resistor 191 is connected between the control grid 185 and the right anode $r_{14}$ of the fourth binary stage in the counter unit 52. When this anode becomes non-conducting the potential at control grid 185 assumes a positive value sufficient for tube 190 to conduct and energize relay $X_6$. When this action takes place the mobile contact 195 of this relay closes on the open-circuited fixed contact 197. This resets the counter unit 52 through line 201 connected to each of the binary stages in this counter unit, as shown in Fig. 4. Also, this resets each of the decades in counter 10 (Fig. 1) through line 202, which is connected to the reset terminal of each of these decades.

As already described, each of the other relays $X_1$–$X_5$ in the counter unit 52 in the stepping switch is provided with a movable contact which closes on a fixed contact to complete the circuit to the pen recorder from the readout terminal of the appropriate decade in the counter 10.

In the operation of the counter unit 52 in the stepping switch the conditions established by successive input pulses are as shown in the following table, with X denoting conduction maintained through the period following a pulse and before the next pulse is received, $t$ denoting temporary conduction which is initiated by an input pulse but which is then eliminated due to feedback, and $f$ denoting conduction caused by feedback.

| Pulse | $V_1$ | | $V_2$ | | $V_3$ | | $V_4$ | |
|---|---|---|---|---|---|---|---|---|
| | $l_1$ | $r_1$ | $l_2$ | $r_2$ | $l_3$ | $r_3$ | $l_4$ | $r_4$ |
| 0 | | X | | X | | X | | X |
| 1 | X | | | X | | X | | X |
| 2 | | X | X | | | X | | X |
| 3 | X | | X | | | X | | X |
| 4 | | X | $f$ | $t$ | X | | | X |
| 5 | X | | | X | | X | | X |
| 6 | | X | | X | | X | X | |

The binary stages in the counter unit 52 are adjusted such that initially, at "pulse zero," each of the right anodes, $r_{11}$, $r_{12}$, $r_{13}$ and $r_{14}$ conducts. At this time the resistance matrix for each of the amplifier tubes 54–58 which control the energization of relays $X_1$–$X_6$, respectively, has at least one resistor connected to a conducting anode (at low positive potential) in the counter unit. Also, relay $X_6$ is non-conducting because resistor 191 is connected to the conducting anode $r_{14}$ in the fourth binary stage. As a result, each of these amplifier tubes is cut off and each of the relays $X_1$–$X_6$ is de-energized.

At pulse 1 the right anode $r_{11}$ of the first binary stage ($V_{11}$) in the counter unit 52 ceases to conduct and the left anode $l_{11}$ in this stage begins to conduct. Because of the cut-off of anode $r_{11}$, each of the resistors 140–142 in the resistance matrix for amplifier tube 54 is now connected to a non-conducting anode in the counter unit 52. For this reason the control grid 132 of tube 54 assumes a positive potential which renders this tube conductive, so that the coil of relay $X_1$ is energized. The other relays $X_2$–$X_5$ remain de-energized because the corresponding resistance matrices include at least one resistor connected to a conducting anode in the counter unit. Relay $X_6$ remains de-energized.

At pulse 2 the left anode $l_{11}$ of the first binary stage ceases to conduct, the right anode $r_{11}$ of the first binary stage begins to conduct, the right anode $r_{12}$ of the second binary stage ($V_{12}$) ceases to conduct, and the left anode $l_{12}$ of the second binary stage begins to conduct. The right anodes $r_{13}$ and $r_{14}$ of the third and fourth binary stages remain conducting. As a result of the cut-off of anode $r_{12}$, each of the resistors 150–152 in the resistance matrix for amplifier tube 55 is connected to a non-conducting anode in the counter unit 52. Accordingly, the control gird 138 of this amplifier tube assumes a positive potential, causing this tube to conduct, thereby energizing the coil of relay $X_2$. At the same time, due to the conduction at anode $r_1$ the potential at the control grid 132 of amplifier tube 54 drops to a negative value and this tube cuts off, thereby de-energizing the relay $X_1$ which had been energized in response to the first input pulse. The remaining relays $X_3$, $X_4$, $X_5$ and $X_6$ remain de-energized.

At pulse 3 the right anode $r_{11}$ of the first binary stage ceases to conduct, the left anode $l_{11}$ of the first binary stage begins to conduct, the left anode $l_{12}$ of the second binary stage remains conducting, and the right anodes $r_{13}$ and $r_{14}$ of the third and fourth binary stages remain conducting. As a result of the cut-off of anode $r_{11}$ each of the resistors 160–162 in the resistance matrix for amplifier tube 56 is connected to a non-conducting anode in the counter unit. Accordingly, the control grid 155 in this amplifier tube assumes a positive potential which causes this tube to conduct and energize relay $X_3$. Relay $X_2$, which had been energized just previously in response to the second input pulse, is de-energized since the resistor 150 in the corresponding resistance matrix is connected to the now conducting anode $l_{11}$ of the first binary stage. The other relays $X_1$, $X_4$, $X_5$ and $X_6$ remain de-energized.

At pulse 4 the left anode $l_{11}$ of the first binary stage ceases to conduct, the right anode $r_{11}$ of the first binary stage begins to conduct, the right anode $r_{12}$ of the second binary stage begins to conduct temporarily and causes the left anode $l_{13}$ of the third binary stage ($V_{13}$) to conduct. Due to the feedback connection through capacitor 120 and resistor 121 from the third binary stage back to the second binary stage, the current in the second binary stage is immediately switched back to the left anode $l_{12}$. The right anode $r_{14}$ in the fourth binary stage remains conducting. As a result of cut-off of anode $l_{11}$, each of the resistors 170–172 in the resistance matrix for the amplifier tube 57 is connected to a non-conducting anode in the counter unit 52. Therefore, the potential at control grid 165 of this amplifier tube rises to a positive value, so that this tube conducts and energizes relay $X_4$. Relay $X_3$, which had been energized just previously, is de-energized in response to the shifting of current back to the right anode $r_{11}$ of the first binary stage, which lowers the potential at the control grid 155 of the amplifier tube 56 controlling the energization of this delay. The other relays $X_1$, $X_2$, $X_5$ and $X_6$ remain de-energized.

At pulse 5 the left anode $l_{11}$ of the first binary stage begins to conduct, the right anode $r_{11}$ of the first binary stage ceases to conduct, the left anode $l_{12}$ of the second binary stage remains conducting, the left anode $l_{13}$ of the third binary stage remains conducting, and the right anode $r_{14}$ of the fourth binary stage remains conducting. As a result of the cut-off of anode $r_{11}$, each of the resistors 181–182 in the resistance matrix for amplifier tube 58 is connected to a non-conducting anode in the counter unit. Therefore, the control grid 175 in this amplifier tube assumes a positive potential, causing this tube to conduct and energize relay $X_5$. Relay $X_4$, which had been energized just previously, is de-energized in response to the switching of current back to the left anode $l_{11}$ in the first binary stage in the counter unit. The other relays $X_1$, $X_2$, $X_3$ and $X_6$ remain de-energized.

At pulse 6 the right anode $r_{11}$ of the first binary stage begins to conduct and the left anode $l_{11}$ of this stage ceases to conduct. The right anode $r_{12}$ of the second binary stage begins to conduct and the left anode $l_{12}$ of this binary stage ceases to conduct. The conduction at anode $r_{12}$ triggers the third binary stage ($V_{13}$) so that the right anode $r_{13}$ of this stage begins to conduct temporarily. This in turn triggers the fourth binary stage ($V_{14}$) so that the right anode $r_{14}$ of this stage ceases to conduct and the left anode $l_{14}$ begins to conduct. Due to the cut-off of the right anode $r_{14}$ in the fourth binary stage, the potential at the control grid 185 of amplifier tube 190 rises to a positive value, causing this tube to conduct and energize relay $X_6$. When relay $X_6$ is thus energized, it closes movable contact 195 on the open-circuited fixed contact 197 which resets the counter unit 52 back to the initial condition which prevailed at "pulse zero."

*Pen recorder*

In one practical embodiment the pen recorder is of the type disclosed and claimed in U. S. Patent 2,478,329 to H. Shaper. This pen recorder is of the moving coil galvanometer type, comprising a movable coil spring-mounted between the poles of a permanent magnet and a pen stylus connected to the coil. The deflection of the stylus from a neutral position is proportional to the current through the coil.

Figure 3:
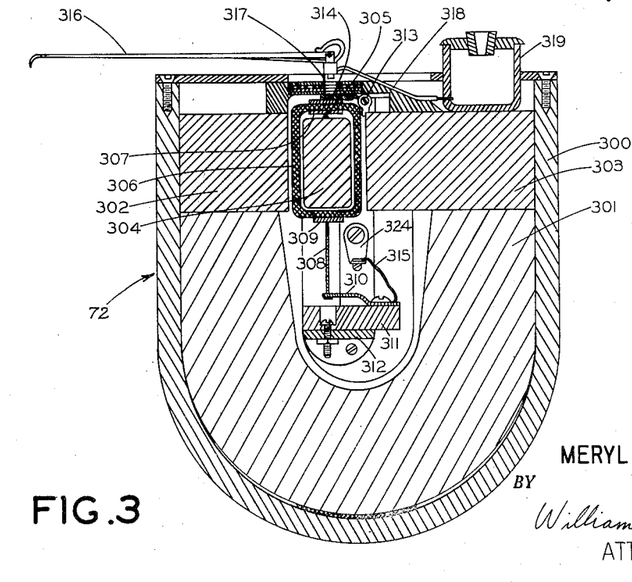
Figure 3 is a section through the pen motor in the visual recorder of the Fig. 1 combination.

Referring to Fig. 3, the recording pen comprises a housing 300 of aluminum or other suitable material within which is positioned a horseshoe magnet 301 provided with confronting soft iron pole pieces 302 and 303. A soft iron core 304 is supported rigidly by the housing and is positioned between the pole pieces 302, 303. The core 304 carries a pivot point 305 on its upper end which provides a pivotal support for the wire coil loop 306. A pivot block 307 is attached, as by shellac or another suitable adhesive, to the inner surface of coil 306 at the latter's upper end and rests pivotally on the pivot point 305. A torsion wire 308 is secured at its upper end to a plate 309 attached to the outer face of coil 306 at the latter's lower end. At its lower end the torsion wire 308 is connected to a spring 310 which is secured to a block 311 pivotally adjustable on a brass plate 312 attached fixedly to the housing. Spring 310 exerts tension on wire 308, maintaining the coil 306 pivotally seated on the pivot point 305.

With this construction the coil 306 is suspended on core 304 between each of the pole tips 302, 303 and this core. The magnetic flux between the pole tips 302, 303 is focused through core 304 and establishes a concentrated and uniform magnetic field at the air-gap where coil 306 is located.

Electrical connections are made to coil 306 through a first terminal 313 and a torsion wire 314 connected to the upper end of the coil, and through a second terminal 314, conductor 315, spring 310 and torsion wire 308 connected to the lower end of the coil.

A pen stylus 316 has a connection through a torsion wire 317 to the upper end of coil 306. Ink is supplied to the pen stylus through a conduit 318 extending from an ink reservoir 319.

In the operation of this recording pen, the pivoted coil 306 and the pen stylus 316 turn about the pivot 305 an amount proportional to the current through the coil. Accordingly, the displacement of the outer end of the pen stylus away from its neutral position (at zero current through coil 306) gives an indication of the magnitude of the current through coil 306.

*Control for counter and stepping switch*

Referring to Fig. 1, the control 200 for the counter 10 and the stepping switch 51 in the present invention comprises a clock pulse generator 210 which generates pulses at a predetermined rate. The time interval between successive pulses from the clock pulse generator 210 is the time during which the counter 10 is enabled for counting. For example, this time interval might be one second or less.

The clock pulse generator 210 feeds into a gate 211, which has its output coupled to the input terminal 212 of a first binary stage comprising a double triode 213 which has its grids and plates cross-connected in the same manner as each of the binary stages in the counter decade of Fig. 2. Each pulse applied to the input terminal 212 of this binary stage causes the conduction to shift from one side to the other in the double triode 213.

The right anode $r_{21}$ in this first binary stage is connected through line 214 to the control electrode of a gate 215, which controls the application of input pulses to the input terminal 17a of counter 10.

The right anode $r_{21}$ of this first binary stage also is coupled through capacitor 216 to the input terminal 217 for a second binary stage identical to the first. This second binary stage comprises a double triode 218 having the respective grids and anodes cross-connected. In the same manner as in the counter decades, the conduction in the double triode 218 in the second binary stage reverses for every two input pulses applied to the input terminal 212 for the first binary stage.

The left anode $l_{22}$ in this second binary stage is connected through line 219 to the control electrode in the gate 211.

The right anode $r_{22}$ in this second binary stage is connected through line 220 to the control electrode of a gate 221 connected between a clock pulse generator 222 and the input terminal 53 of the counter unit 52 in the stepping switch 51. The clock pulse generator 222 generates pulses at a rate several times the pulse repetition rate of the generator 210, for a reason which will be apparent.

Operation

In the operation of this system, assume that the clock pulse generator 210 generates one pulse per second and the clock pulse generator 222 generates 50 pulses per second. In the two binary stages in the control circuit 200, initially the right anodes conduct. The relatively low positive potential at the conducting right anode $r_{21}$ in the first binary stage is insufficient to render gate 215 conductive. Therefore, the input pulses are blocked from the counter 10. Also, the relatively low positive potential at the conducting right anode $r_{22}$ in the second binary stage is insufficient to render gate 221 conductive. Accordingly, the 50 cycle per second pulses from clock pulse generator 222 are blocked from the input terminal for the stepping switch 51. At the same time, the non-conducting left anode $l_{22}$ in the second binary stage applies a positive potential to gate 211 which renders the latter conductive.

The first pulse from the clock pulse generator 210 passes through gate 211 to the input terminal 212 of the first binary stage, reversing the conduction in this binary stage, with the following result:

Gate 215 is rendered conductive (due to the high potential at the now non-conducting right anode $r_{21}$ in the first binary stage in the control circuit) so that the counter 10 now starts to count pulses. The stepping switch 51 remains disabled.

The second pulse from the clock pulse generator 210 (which in the particular embodiment under discussion occurs one second after the first pulse) reverses again the conduction in the first binary stage in the control circuit, with the following results:

(1) Gate 215 is rendered non-conductive (due to the lowered potential at the now conducting anode $r_{21}$ in the first binary stage in the control circuit), thereby stopping the application of input pulses to counter 10, which now has a complete pulse count for the one second interval;

(2) Gate 221 is rendered conductive (due to the high potential at the now non-conducting right anode $r_{22}$ in the second binary stage in the control circuit), initiating the operation of stepping switch 51 in response to the pulses delivered by clock pulse generator 222.

The stepping switch 51 now connects the readout terminals 40e, 40d, 40c, 40b and 40a in the counter 10 rapidly in succession to the pen recorder 72. The pen recorder records the total pulse count at counter 10 at the end of the one second interval.

At the completion of the operation of the stepping switch 51, which occurs when the sixth pulse from the clock pulse generator 222 is applied to the input terminal 53 of the counter unit 52 in the stepping switch, relay $X_6$ in the stepping switch is energized, resetting the counter unit 52 in the stepping switch, resetting each of the decades in counter 10 and resetting each of the binary stages in the control circuit 200. This restores all portions of the system to the orignial condition.

It is to be understood that, while there has been disclosed herein a specific preferred embodiment of the present invention, various modifications, omissions and refinements which depart from the disclosed embodiment may be resorted to without departing from the spirit and scope of this invention. For example, a different type of stepping switch and/or a different type of visual recorder might be employed in combination with the counter having a stepped voltage readout from each decade to accomplish the purposes of the present system.

I claim:

1. In combination, a counter comprising a plurality of counter units each having an input terminal, an output terminal and a readout terminal, said counter units being connected in series with the input terminal of each counter unit except the first coupled to the output terminal of the immediately preceding counter unit in the series, means for applying input pulses to the input terminal of the first counter unit in the series, means for causing each counter unit to complete a cycle of operation and deliver a pulse to its output terminal in response to a predetermined number of input pulses to its input teriminal, and each counter unit having means for producing at its readout terminal a voltage representative of the pulse count in that counter unit, a visual recorder, and means operative to connect the readout terminals of the counter units individually in succession to said recorder.

2. In combination, a counter comprising a plurality of counter units connected in series, each of said counter units having a plurality of binary stages coupled in series to render each of said stages except the first operable in response to two operations of the next preceding stage, means coupled to the first stage for applying input pulses thereto, means interconnecting certain of the binary stages to cause the counter unit to complete a cycle of operation after a predetermined number of input pulses to the first stage, and a plurality of impedances connected respectively between individual ones of the binary stages and a common readout terminal and having ohmic values in inverse proportion to the adding weights of the corresponding binary stages to cause the potential at said common readout terminal to change in successive stages in the same direction in response to successive input pulses to the first binary stage throughout a cycle of operation of the counter unit, a visual recorder, and stepping switch means operative to connect said visual recorder to the readout terminals for the counter units individually in succession.

3. In combination, a counter comprising a plurality of counter decades connected in series, each of said counter decades having a plurality of counting stages coupled in series to render each of said stages except the first operable in response to two operations of the next preceding stage, means coupled to the first stage for applying input pulses thereto, means coupling together certain of said stages for causing the counter decade to complete a cycle of operation in response to ten input pulses to the first stage, said counting stages having predetermined adding weights in the counter decade, and a plurality of impedances connected respectively between individual ones of the counting stages and a common readout terminal, said impedances having ohmic values proportioned inversely to the adding weights of the corresponding counting stages to cause the potential at said common readout terminal to change in successive stages in the same direction in response to the successive input pulses to the first counting stage throughout a cycle of operation of the counter decade, a visual recorder, and stepping switch means for connecting said visual recorder to the readout terminals for the counter decades individually in succession.

4. In combination, a counter comprising a plurality of counter decades connected in series, each counter decade comprising first, second, third and fourth binary stages coupled together for operation in binary progression and having feedback connections among certain of the binary stages which causes the counter decade to complete a cycle of operation in response to ten input pulses to the first binary stage, first, second, third and fourth resistors connected respectively between individual ones of the binary stages and a common readout terminal, said resistors in the order named having the ohmic proportions 4:2:2:1 and establishing at the common readout terminal successive voltages which change in successive equal steps in the same direction in response to successive input pulses to the first binary stage throughout a cycle of operation of the counter decade, a visual recorder, and stepping switch means for connecting said visual recorder to the readout terminals for the counter decades individually in succession.

5. In combination, a counter comprising a plurality of counter decades connected in series, each counter decade comprising first, second, third and fourth binary stages coupled together for operation in binary progression and having feedback connections among certain of the binary stages which cause the counter decade to complete a cycle of operation in response to ten input pulses to the first binary stage, first, second, third and fourth resistors connected respectively between individual ones of the binary stages and a common readout terminal, said resistors in the order named having the ohmic proportions 4:2:2:1 so as to establish at the common readout terminal successive voltages which change in successive equal steps in the same direction in response to successive input pulses to the first binary stage throughout a cycle of operation of the counter decade, a visual recorder, stepping switch means for connecting said visual recorder to the readout terminals for the counter decades individually in succession, means for terminating the counting operation of the counter, and means for initiating the switching operation of said stepping switch means at the termination of the counting operation by the counter.

6. In combination, a counter comprising a plurality of counter decades connected in series, each of said counter decades having a plurality of counting stages coupled in series to render each of said stages except the first operable in response to two operations of the next preceding stage, means coupled to the first stage for applying input pulses thereto, means coupling together certain of said stages for causing the counter decade to complete a cycle of operation in response to ten input pulses to the first stage, said counting stages having predetermined adding weights in the counter decade, and a plurality of impedances connected respectively between individual ones of the counting stages and a common readout terminal, said impedances having ohmic values proportioned inversely to the adding weights of the corresponding counting stages to cause the potential at said common readout terminal to change in successive stages in the same direction in response to the successive input pulses to the first counting stage throughout a cycle of operation of the counter decade, a visual recorder, stepping switch means operative to connect said visual recorder to the readout terminals for the counter decades individually in succession, means for terminating the application of input pulse to the counter to stop the counting operation of the counter, means for initiating the switching operation of said stepping switch means at the stopping of the counting operation of the counter, and means for resetting the counter at the completion of the switching operation.

7. In combination, a counter comprising a plurality of counter decades connected in series, each counter decade having first, second, third and fourth binary stages each having input and output terminals and each including a pair of electron discharge tubes having anode, cathode and grid electrodes, each of said pairs of electron discharge tubes having their anodes and grids cross-connected so that current is conducted by either one or the other of said pair, means coupling the output terminals of the first, second and third stages respectively to the input terminals of the second, third and fourth stages, means for applying input pulses to the first stage, a feedback connection between the fourth and third stages and a feedback connection between the third and second stages so that one pulse is delivered at the output terminal of the fourth stage in response to ten input pulses to the first stage, a first resistor having one of its terminals connected to one anode of the first binary stage, a second resistor having one of its terminals connected to one anode of the second binary stage and having a resistance value of one-half that of said first resistor, a third resistor having one of its terminals connected to one anode of the third binary stage and having a resistance value one-half that of said first resistor, and a fourth resistor having one of its terminals connected to one anode of the fourth binary stage and having a resistance value one-fourth that of said first resistor, said resistors having their other terminals connected to a common readout terminal at which are established successive potentials which change progressively in discrete steps in response to successive input pulses to the first binary stage, a visual recorder, stepping switch means operative to connect said visual recorder to the readout terminals for the counter decades individually in succession, means for stopping the application of input pulses to the first binary stage of the first decade in the counter to terminate the counting operation of the counter, and means for initiating the switching operation of said stepping switch means when the counting operation of the counter is terminated.

8. In combination, a counter comprising a plurality of counter decades connected in series, each counter decade having first, second, third and fourth binary stages each having input and output terminals and each including a pair of electron discharge tubes having anode, cathode and grid electrodes, each of said pairs of electron discharge tubes having their anodes and grids cross-connected so that current is conducted by either one or the other of said pair, means coupling the output terminals of the first, second and third stages respectively to the input terminals of the second, third and fourth stages, means for applying input pulses to the first stage, a feedback connection between the fourth and third stages and a feedback connection between the third and second stages so that one pulse is delivered at the output terminal of the fourth stage in response to ten input pulses to the first stage, a first resistor having one of its terminals connected to one anode of the first binary stage, a second resistor having one of its terminals connected to one anode of the second binary stage and having a resistance value of one-half that of said first resistor, a third resistor having one of its terminals connected to one anode of the third binary stage and having a resistance value one-half that of said first resistor, and a fourth resistor having one of its terminals connected to one anode of the fourth binary stage and having a resistance value one-fourth that of said first resistor, said resistors having their other terminals connected to a common readout terminal at which are established successive potentials which change progressively in discrete steps in response to successive input pulses to the first binary stage, a visual recorder, stepping switch means operative to connect said visual recorder to the readout terminals for the counter decades individually in succession, a gate controlling the application of input pulses to the counter, means controlling the switching operation of said stepping switch means, a control for said gate and said last-mentioned means operative at a predetermined time to actuate said gate to terminate the application of input pulses to the counter and to initiate the switching operation of said stepping switch means, and means for resetting the counter at the completion of the switching operation of said stepping switch means.

References Cited in the file of this patent

UNITED STATES PATENTS

| | | |
|---|---|---|
| 2,207,743 | Larson et al. | July 6, 1940 |
| 2,319,412 | Leathers | May 18, 1943 |
| 2,335,755 | Haddad | Nov. 30, 1943 |
| 2,585,630 | Crosman | Feb. 12, 1952 |
| 2,658,139 | Abate | Nov. 3, 1953 |
| 2,680,240 | Greenfield | June 1, 1954 |
| 2,700,750 | Dickinson | Jan. 25, 1955 |
| 2,718,634 | Hansen | Sept. 20, 1955 |

UNITED STATES PATENT OFFICE
CERTIFICATE OF CORRECTION

Patent No. 2,860,832                        November 18, 1958

Meryl C. Burns

It is hereby certified that error appears in the printed specification of the above numbered patent requiring correction and that the said Letters Patent should read as corrected below.

Column 4, line 39, for "in conducting" read -- is conducting --; column 6, line 24, for "quire" read -- quite --; column 8, line 64, for "in conducting" read -- is conducting --; column 9, line 31, for "to potential" read -- the potential --; column 10, line 4, for "through" read -- throughout --; line 55, for "gird 138" read -- grid 138 --; column 11, line 25, for "delay" read -- relay --; column 14, line 61, for "causes" read -- cause --.

Signed and sealed this 31st day of March 1959.

(SEAL)
Attest:

KARL H. AXLINE                                  ROBERT C. WATSON
Attesting Officer                                Commissioner of Patents